United States Patent
Das et al.

(10) Patent No.: US 8,908,808 B2
(45) Date of Patent: Dec. 9, 2014

(54) SYSTEMS AND METHODS FOR DEMODULATING A SIGNAL

(75) Inventors: Sajal Kumar Das, Bangalore (IN); Aravindh Krishnamoorthy, Bangalore (IN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 416 days.

(21) Appl. No.: 13/303,268

(22) Filed: Nov. 23, 2011

(65) Prior Publication Data
US 2013/0070828 A1    Mar. 21, 2013

(30) Foreign Application Priority Data
Sep. 16, 2011  (IN) .............. 2691/DEL/2011

(51) Int. Cl.
H04L 27/22   (2006.01)
H04L 25/06   (2006.01)
H04L 25/03   (2006.01)

(52) U.S. Cl.
CPC .............. H04L 25/067 (2013.01); H04L 27/22 (2013.01); H04L 25/03057 (2013.01); H04L 25/03318 (2013.01); H04L 25/061 (2013.01); H04L 2025/03407 (2013.01)
USPC .......................................................... 375/322

(58) Field of Classification Search
CPC ........... H04B 17/00; H03D 1/00; H03D 1/04; H03D 3/06; H04L 27/06; H04L 27/10; H04L 27/22; H04W 72/0446
USPC .......... 370/210, 252, 311, 329, 337; 375/226, 375/260, 271, 316, 322, 324, 340, 341, 346
See application file for complete search history.

(56) References Cited

U.S. PATENT DOCUMENTS

2005/0089113 A1   4/2005  Seidl
2005/0157822 A1*  7/2005  Khandekar et al. ........... 375/340

(Continued)

FOREIGN PATENT DOCUMENTS

WO       0045504 A1     8/2000
WO    2009025934 A1     2/2009

OTHER PUBLICATIONS

Han, S., et al., "New Soft-Output MLSE Equalization Algorithm for GSM Digital Cellular Systems", Universal Personal Communications, 1995, Record., 1995 Fourth IEEE International Conference on, vol. , No. , pp. 919-923, Nov. 6-10, 1995.

(Continued)

Primary Examiner — Jaison Joseph
Assistant Examiner — Shawkat M Ali
(74) Attorney, Agent, or Firm — Rothwell, Figg, Ernst & Manbeck, P.C.

(57) ABSTRACT

A high-sensitivity receiver may be made by using multiple demodulators to demodulate a given signal. For example, the receiver may use a first demodulator to demodulate an input signal into a first sequence of soft bits and a second demodulator to demodulate the same input signal into a second sequence of soft bits. The two sequences of soft bits may then be compared and combined to create a sequence of hard bits. For example, in some embodiments, a soft bit combiner may combine the two sequences of soft bits into a third sequence of soft bits, which may then be input into a decoder to produce the final decoded hard bits. The secondary demodulator may be less complex, less expensive, demand less power, and/or require fewer computational resources when operating, than the first demodulator.

29 Claims, 11 Drawing Sheets

(56) References Cited

U.S. PATENT DOCUMENTS

2009/0052591 A1* 2/2009 Chen .......................... 375/341
2010/0150272 A1* 6/2010 Nieto .......................... 375/329
2010/0322358 A1 12/2010 Drumm et al.

OTHER PUBLICATIONS

International Search Report and Written Opinion issued on Mar. 21, 2013 in PCT application No. PCT/SE2012/050952, 12 pages.

* cited by examiner code 1015 a set of instructions for using two sequences of soft bits (or a sequence of soft bits and a sequence of hard bits) to determine a new sequence of soft bits
1105 a set of instructions for determining a set of RA values and determining a sequence of bit values based on (1) angles corresponding to a sequence of CSPs and (2) the RA values
1110

*FIG. 11*

SYSTEMS AND METHODS FOR DEMODULATING A SIGNAL

RELATED APPLICATION

This application claims priority to India provisional Patent Application Serial No. 2691/DEL/2011, filed Sep. 16, 2011.

TECHNICAL FIELD

The invention relates to the field of demodulation.

BACKGROUND

Digital cellular networks, such as the Global System for Mobile Communications (GSM) support billions of subscribers worldwide. In such networks, entities are often configured to communicate using modulated radio signals according to a given protocol. A sender that needs to communicate a sequence of bits would create a radio signal (e.g., RF signal) and modulate that signal according to a given modulation protocol. For example, GSM uses a Gaussian minimum shift keying (GMSK) modulation protocol where the phase of the signal is shifted at different times, such that shifts by different amounts indicate given bits. A receiver in such a system receives the RF signal and demodulates it to determine the intended sequence of bits based on the sequence of shifts in the signal.

One of the most important characteristics of a receiver is its sensitivity. Sensitivity refers to the smallest power level of an input signal at which the receiver can still detect and decode the signal correctly (i.e. within a bounded bit error rate (BER)). More sensitive receivers may achieve a higher transfer quality while less sensitive receivers may experience call quality degradation, handover failure, call drop, and/or other problems. Accordingly, there is a need for new ways to produce highly sensitive receivers.

SUMMARY

The wireless industry is in need of highly sensitive receivers for wireless communication protocols. For example, cellular telephones, tablets, and other mobile devices require sensitive receivers to ensure high quality voice and data transfer. One way to improve receiver sensitivity is to improve a receiver's demodulation mechanisms. Unfortunately, many of today's demodulation techniques are either too complex, too computationally or financially expensive to implement in the receiver, and/or do not provide substantial gain in some scenarios. For example iterative receiver techniques (e.g., Turbo) introduce large delays and require significant computational resources (e.g., memory, processing). New techniques and mechanisms for improved demodulation are described herein.

According to some embodiments, a high-sensitivity receiver may be made by using multiple demodulators to demodulate a given signal. For example, the receiver may use a first demodulator to demodulate an input signal into a first sequence of soft bits and a second demodulator to demodulate the same input signal into a second sequence of soft bits. The two sequences of soft bits may then be compared and combined to create a sequence of hard bits. For example, in some embodiments, a soft bit combiner may combine the two sequences into a third sequence of soft bits, which may then be input into a decoder to produce the final decoded hard bits.

Accordingly, in one aspect, an embodiment provides a method for demodulating and decoding a signal in a receiving device comprising a first demodulator (e.g., a conventional demodulator) and a second demodulator (e.g., an angle based demodulator). The method may begin with receiving, at the receiving device, a signal transmitted by a transmitting device. The receiving devices processes the signal to produce a sequence of complex sample pairs (CSP1, CSP2, . . . , CSPN). The first demodulator receives the sequence of CSPs and uses the received sequence of CSPs to determine a first sequence of soft bit values (sbv1[n]). The second demodulator also receives the sequence of CSPs and uses the received sequence of CSPs to determine a second sequence of soft bit values (sbv2[n]) and/or a first sequence of hard bit values hbv[n]. A combiner determining a third sequence of soft bit values (sbv3[n]) based on (a) sbv1[n] and sbv2[n] or (b) sbv1[n] and hbv[v]. A decoder uses sbv3[n] to determine the final sequence of hard bits. In some embodiments, each soft bit value included in the first sequence of soft bit values comprises a confidence value. In these embodiments, the step of determining sbv3[n], comprises comparing sbv1[i] with sbv2[i], for i=1, . . . , n, to determine whether the sign of sbv1[i] matches the sign of sbv2[i]; and increasing the confidence value of sbv1[i] by a first amount in response to determining that the sign of sbv1[i] matches the sign of sbv2[i] or decreasing the confidence value of sbv1[i] by a second amount in response to determining that the sign of sbv1[i] does not match the sign of sbv2[i]. In some embodiments, the first amount is about 30 percent of the confidence value and the second amount is about 90 percent of the confidence value. In other embodiments, the step of determining sbv3[n], comprises comparing sbv1[i] with hbv[i], for i=1, . . . , n, to determine whether the sign of sbv1[i] matches hbv[i] and increasing the confidence value of sbv1[i] by a first amount in response to determining that the sign of sbv1[i] matches hbv[i] or decreasing the confidence value of sbv1[i] by a second amount in response to determining that the sign of sbv1[i] does not match hbv[i].

In some embodiments, the receiving device includes a channel estimation unit that outputs a channel response h[ ], and the first demodulator receives the channel response and uses the received channel response and the received sequence of CSPs to determine the first sequence of soft bit values (sbv1[n]). In some embodiments, the second demodulator produces an initial sequence of soft bit values before outputting the second sequence of soft bit values, and the second demodulator receives the first sequence of soft bit values and uses the received first sequence of soft bit values and the initial sequence of soft bit values to produce the second sequence of soft bit values.

In some embodiments, the first demodulator uses one or more of: a decision feedback sequence estimation (DFSE) type algorithm, maximum likelihood sequence estimation (MLSE) type algorithm, and a maximum a posteriori (MAP) type algorithm, in producing the first sequence of soft bit values.

In some embodiments, the first demodulator uses at least a first amount of processing power to produce the first sequence of soft bit values, the second demodulator uses at most a second amount of processing power to produce the second sequence of soft bit values, and the second amount of processing power is less than 80% of the first amount of processing power. In these or other embodiments, the first demodulator uses at least a first amount of battery power to produce the first sequence of soft bit values, the second demodulator uses at most a second amount of battery power to produce the second sequence of soft bit values, and the second amount of battery power is less than 60% of the first amount of battery power.

In another aspect, some embodiments provide an angle based demodulation method. In some embodiments, the angle based demodulation method includes receiving, at a receiving device, a signal transmitted by a transmitting device. The method also includes processing, by the receiving device, the signal to produce a sequence of complex sample pairs ($CSP_1, CSP_2, \ldots, CSP_N$), wherein each complex sample pair ($CSP_i$) has a corresponding angle $A_i$, for i=1 . . . N. The method further includes determining a set of two or more reference angle (RA) values, and determining a set of bit values based on: (i) the angles corresponding to the sequence of CSPs and (ii) the set of RA values, wherein each bit value included in the set of bit values corresponds to an adjacent pair of CSPs.

In some embodiments, the step of determining the set of bit values comprises selecting a bit value to correspond to a particular pair of said CSPs ($CSP_i$, $CSP_{i+1}$). In some embodiments, the step of selecting a bit value to correspond to said particular pair ($CSP_i$, $CSP_{i+1}$) of said CSPs comprises: (1) determining a set of two or more cumulative angle error (CAE) values, the set of CAE values comprising a minimum CAE value that is associated with a particular bit value, (2) determining the minimum CAE (min-CAE) value, and (3) selecting the particular bit value associated with the minimum CAE value to correspond to said particular pair ($CSP_i$, $CSP_{i+1}$) of said CSPs.

In some embodiments, the method also includes determining a bit confidence value (BCV) based on the determined minimum cumulative angle error value (min-CAEV). In some embodiments, the step of determining the BCV comprises computing: 1024/Abs_Val(min-CAE). In some embodiments, the method also includes producing a soft bit value equal to sv*BCV, wherein sv=1 or −1, depending on the selected particular bit value. In some embodiments, a log-likelihood ratio (LLR) based method can be used to producing a soft bit value.

In some embodiments, the step of determining the set of two or more CAE values comprises (1) determining a first cumulative angle error value ($CAEV_1$) associated with a first sequence of one or more bits, which step comprises: determining a first error value $E_1$, where $E_1$ equals a difference between $AD_i$ and $RA_1$, wherein ADi is an angle difference value representing the difference between $A_{i+1}$ and $A_i$, and $RA_1$ is a first reference angle value selected from the set of RA values; and (2) determining a second cumulative angle error value ($CAEV_2$) associated with a second sequence of one or more bits, which step comprises: determining a second error value $E_2$, where $E_2$ equals a difference between $AD_i$ and $RA_2$, wherein $RA_2$ is a second reference angle value selected from the set of RA values. In some embodiments, $AD_i$ is determined by modulo-PI correcting ($A_{i+1}-A_i$).

In some embodiments, the step of determining $CAEV_1$ further comprises: (i) determining a third error value $E_3$, wherein $E_3$ equals a difference between $AD_{i+1}$ and $RA_3$, and (ii) summing $E_1$ and $E_3$, wherein $AD_{i+1}$ is an angle difference value representing the difference between $A_{i+2}$ and $A_{i+1}$ and $RA_3$ is a third reference angle value selected from the set of RA values. Likewise, in some embodiments, the step of determining $CAEV_2$ further comprises: (i) determining a fourth error value $E_4$, where $E_4$ equals a difference between $AD_{i+1}$ and $RA_4$, and (ii) summing $E_2$ and $E_4$, wherein $RA_4$ is a fourth reference angle value selected from the set of RA values.

In some embodiments, the step of determining the set of two or more cumulative angle error values further comprises: determining a third cumulative angle error value ($CAEV_3$) associated with a third sequence of one or more bits and determining a fourth cumulative angle error value ($CAEV_4$) associated with a fourth sequence of one or more bits. These step may comprise: (i) determining a fifth error value $E_5$, where $E_5$ equals a difference between $AD_{i+1}$ and $RA_5$ and (ii) summing $E_1$ and $E_5$, wherein $RA_5$ is a fifth reference angle value selected from the set of RA values, and (iii) determining a sixth error value $E_6$, where $E_6$ equals a difference between $AD_{i+1}$ and $RA_6$ and (iv) summing $E_2$ and $E_6$, wherein $RA_6$ is a sixth reference angle value selected from the set of RA values, respectively.

In some embodiments, the step of determining $CAEV_1$ further comprises: (i) determining a seventh error value $E_7$, where $E_7$ equals a difference between $AD_{i+2}$ and $RA_7$ and (ii) producing a sum equal to $E_1+E_3$ wherein $AD_{i+2}$ is an angle difference value representing the difference between $A_{i+2}$ and $A_{i+1}$ and $RA_7$ is a seventh reference angle value selected from the set of RA values, and the step of determining $CAEV_2$ further comprises: (i) determining an eighth error value $E_8$, where $E_8$ equals a difference between $AD_{i+2}$ and $RA_8$ and (ii) producing a sum equal to $E_2+E_4+E_8$, wherein $RA_8$ is an eighth reference angle value selected from the set of RA values.

The above and other features are described below.

BRIEF DESCRIPTION OF THE DRAWINGS

The accompanying drawings, which are incorporated herein and form part of the specification, illustrate various embodiments and, together with the description, further serve to explain the principles of the embodiments and to enable a person skilled in the pertinent art to make and use the embodiments. In the drawings, like reference numbers indicate identical or functionally similar elements.

FIG. 11 is a block diagram illustrating a software embodiment.

DETAILED DESCRIPTION

Figure 1:
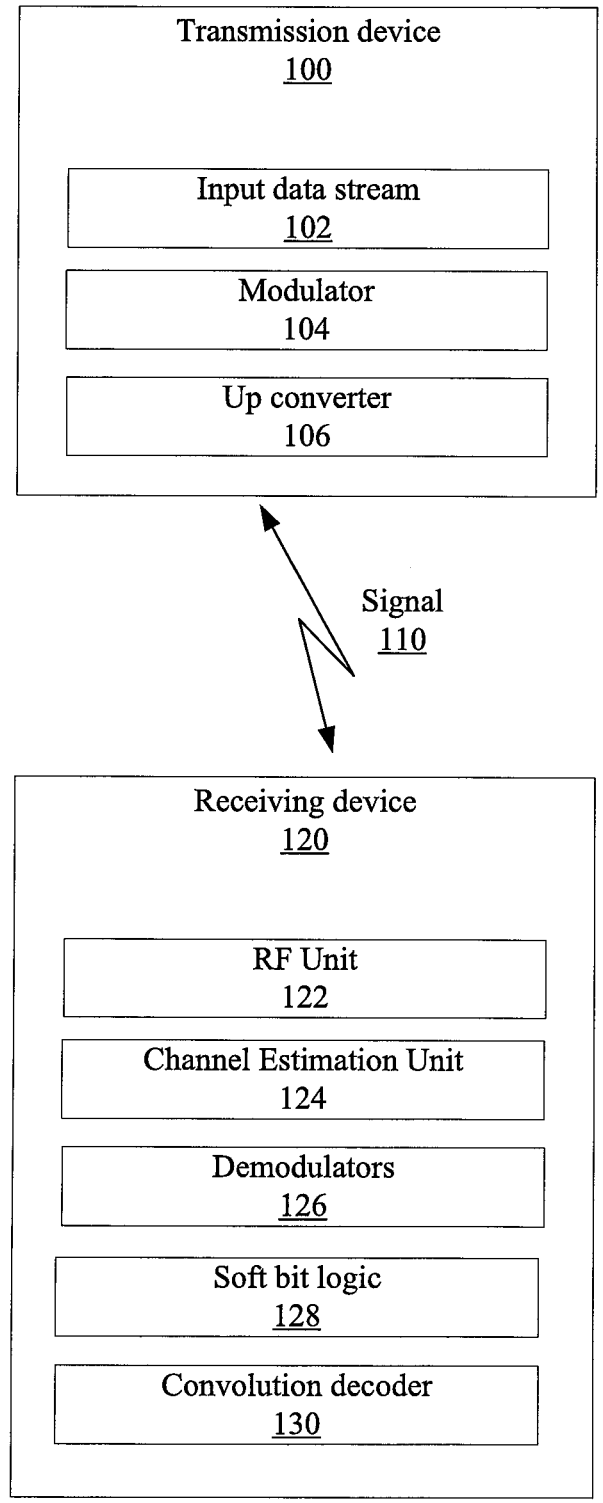
FIG. 1 is a functional block diagram illustrating components of a transmission device and receiving device, according to some embodiments.

As used herein, the term "soft bit" refers to a bit value recommendation. For example, in some embodiments, a soft bit may correspond to a bit value indication (e.g., indication of 0 or 1) and a confidence-level indication (e.g., indication of 75% confidence). The bit value indicated by the soft bit may sometimes be referred to as the sign of the soft bit. Because a soft bit indicates both a value and a confidence, the soft bit may actually comprise multiple bits. For example, a soft bit may be represented using eight bits where one bit represents the sign and the other seven represent the confidence level.

In some embodiments, a demodulator may be configured to output soft bit values rather than make any final decisions about the bit values of an input signal. The sequence of soft bits output by a demodulator may be fed into a decoder unit, which may use the sequence of soft bits to output a sequence of "hard bits." The term "hard bit" refers to a bit value (e.g., 0 or 1) that is eventually decided upon when a signal is decoded.

As described above, in various embodiments, two different demodulators may independently (or semi-independently) interpret the input signal into two different sequences of soft bits. The two sequences may be combined into a third sequence of soft bits, which a decoder may then use to produce the final sequence of hard bits. By combining results from two different demodulators, the quality of the combined sequence of soft bits may be better than either of the two demodulators could do alone. This technique of combining results from multiple demodulators may be referred to herein as "diversity combining."

In some embodiments, a diversity combining receiver may utilize a primary demodulator that is complex and a secondary demodulator that is simple and inexpensive to implement. The secondary demodulator may be less complex, less expensive, demand less power, and/or require fewer computational resources when operating. The reduced financial/computational/power costs of the secondary demodulator may make it more feasible to include such a demodulator in a receiver where the receiver also includes a more complex demodulator.

In some embodiments, the primary and secondary demodulators may be chosen because they are complementary. That is, the two demodulators may operate using different models, where the two models are accurate in different scenarios. For example, in some embodiments, the primary demodulator may correspond to a conventional demodulator (e.g., DFSE, MLSE, MAP, etc.) that may use complex techniques such as channel estimation. Such a primary demodulator may be sensitive to wireless channel conditions, such as time varying fading, impulse noise, speed of the mobile (e.g., Doppler effect, multipath effect), RF saturation, clipping, and/or other RF impairments. In such embodiments, the secondary demodulator may be one that operates on principles that are not sensitive to channel conditions. Because such a secondary demodulator does not need to employ channel estimation techniques, it may be both more financially/computationally/energy efficient as well as more likely to produce good results in scenarios where a more complex, channel-estimation sensitive, primary demodulator might falter.

In various embodiments, other or additional techniques may be used to ensure that the primary and secondary demodulators utilize complementary models. For example, the primary and secondary demodulators may take independent approaches to determining some signal characteristics, such as finding the input signal's training sequence. In another example, a secondary demodulator may be chosen such that is not susceptible to amplitude variation, clipping, saturation, and/or other conditions to which the primary demodulator may be sensitive.

The respective soft bit sequences from the primary and secondary demodulators may be combined using various techniques described herein. For example, the soft bit sequences from the two different demodulators may be combined according to a technique that gives more weight to the models that fit the data better. The diversity combining demodulator may thus increase receiver sensitivity/accuracy in various conditions.

FIG. 1 is a block diagram illustrating the components of a transmission device and receiving device, according to some embodiments. Transmission device 100 may correspond to a communication device (e.g., mobile phone, smartphone, tablet, etc.) or any other device configured to transmit digital signal 110 (e.g., a cell tower, relay, etc.). Receiving device 120 may correspond to another communication device or any other device configured to receive digital signal 110. Digital signal 110 may correspond to any radio signal that has been modulated to indicate a sequence of one or more bits. In some embodiments, signal 110 may be composed of multiple "bursts." Each burst may correspond to a pre-defined number of bits and may be arranged into a predefined structure. For example, a burst may include a standard number of training sequence bits, payload bits, separators, and/or other fields.

According to the illustrated embodiment, transmission device 100 comprises input data stream 102, modulator 104, and up convertor 106. Input data stream 102 may correspond to a sequence of bits (i.e., 0s and 1s) that transmission device 100 needs to transmit. Modulator 104 may be configured to encode data stream 102 in a signal by manipulating that signal according to a given modulation protocol. For example, modulator 104 may utilize GMSK modulation to encode data stream 102. Such a modulator may transmit signal 110 using a series of phase changes that indicate the input data stream 102. According to the illustrated embodiment, transmission device 100 includes up converter 106 for converting a baseband signal to a digitized signal better suited for transmission (e.g., centered at an intermediate frequency). In various embodiments, transmission device 100 may include additional or fewer components and different functionality may be combined or separated further into different components.

In the illustrated embodiment, receiving device 120 includes RF unit 122, channel estimation unit 124, demodulators 126, soft bit logic 128, and channel decoder 130. The illustrated components are intended as an example only. Those of ordinary skill in the art given the benefit of this disclosure will understand that receiving device 120 may include additional or fewer components and different functionality may be combined or separated further into different components.

According to the illustrated embodiment, receiving device 120 includes RF unit 122, which may be configured to receive signal 110. In some embodiments, RF unit 122 may include components configured to down-convert the signal for decoding by receiving device 120.

Channel estimation unit 124 may be configured to estimate the wireless channel-response for the received signal 110. Estimation unit 124 may be configured to pass that channel response to one or more of the equalizer/demodulator units 126. The channel response may directly reflect the channel and RF impairments by estimating the effect of these impairments on one received signal 110. In some embodiments, channel estimation unit 124 may make the estimation based on a training sequence embedded in a burst of signal 110. Such a channel estimator may be configured to re-estimate the channel conditions for each received burst. Using the channel response, demodulator may compensate the received complex (I,Q) samples to achieve a more accurate decoding.

According to the illustrated embodiment, receiving device 120 includes two or more demodulators 126. Demodulators 126 may include a complex primary demodulator and a simple secondary demodulator, as described above.

Receiving device 120 includes soft bit logic 128 for combining respective soft bit sequences from different ones of demodulators 126. For example, soft bit logic 128 may implement a soft bit combiner unit configured to combine soft bit sequences from different demodulators. In various embodiments, a soft bit combiner may combine soft bits from different demodulators according to different algorithms. For example, soft bit logic 128 may apply different weights to soft bits received from a primary demodulator than from a secondary demodulator. In some embodiments, one or more of demodulators 126 may include some of soft bit logic 128. For example, as described below in more detail, the secondary demodulator may consider soft bits from the primary demodulator during operation.

Receiving device 120 includes convolution decoder 130. Convolution decoder 130 receives soft bits and generates hard bits based on those soft bits. In some embodiments, receiving device 120 may comprise a traditional decoder, such as Viterbi. For example, if soft bit logic 128 includes a soft bit combiner that combines soft bits from multiple ones of demodulators 126 into a single soft bit stream, then that soft bit stream may be fed into a traditional decoder, such as Viterbi.

Figure 2:
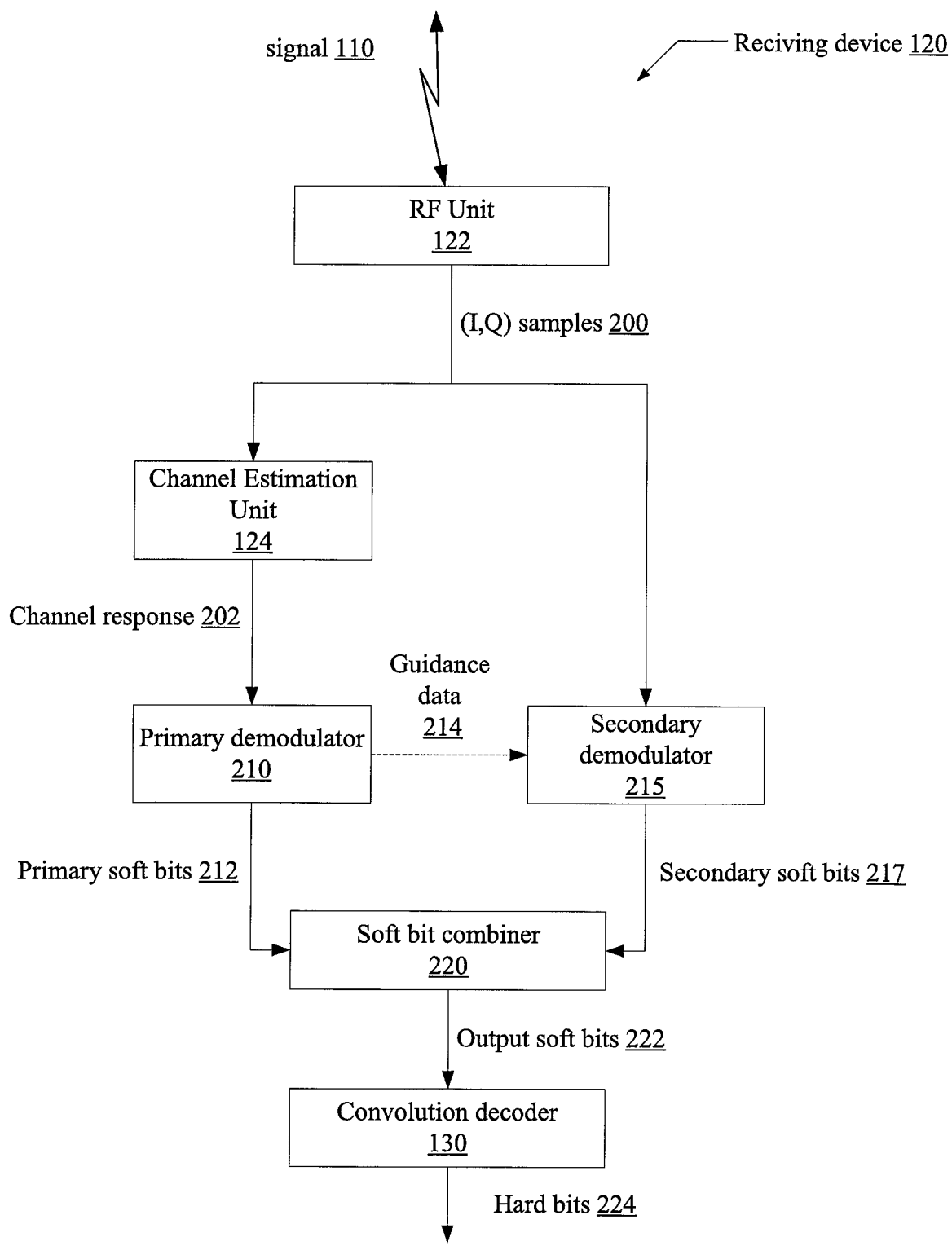
FIG. 2. is a functional block diagram further illustrating components of a receiving device, according to some embodiments.

FIG. 2 is a block diagram illustrating information flow among the components of a receiving device, according to some embodiments. The block diagram of FIG. 2 may correspond to a more detailed view of the components of receiving device 120 of FIG. 1. For consistency, analogous components from FIG. 1 are numbered identically in FIG. 2.

According to FIG. 2, receiving device 120 includes RF unit 122, which may be configured to receive signal 110. RF unit 122 of FIG. 2 may be analogous to RF unit 122 of FIG. 1.

In the illustrated embodiment, RF unit 122 is configured to convert signal 110 into a series of (I, Q) samples 200, according to a given modulation protocol. For example, according to the Gaussian Minimum Shift Keying (GMSK) modulation protocol, each state (i.e., phase) of signal 110 may be represented in polar coordinates as a radius and angle (R, $\Phi$), where radius R is the amplitude of the signal and $\Phi$ is the phase of the signal. Such polar coordinates may be represented as two-dimensional in-phase (I) and quadrature (Q) coordinates (I, Q) where $I=R*\cos(\Phi)$ and $Q=R*\sin(\Phi)$. Thus, each phase of signal 110 may be represented as an (I, Q) tuple known as a "complex sample pair." Other modulation protocols, such as minimum shift keying (MSK) or frequency shift keying (FSK) may also use complex sample pairs to represent phases of a given signal.

According to the illustrated embodiment, (I, Q) samples 200 may be passed into channel estimation unit 124. Channel estimation unit 124 of FIG. 2 may be analogous to channel estimation unit 124 of FIG. 1. Therefore, channel estimation unit 124 may be a complex block, which estimates the channel and passes an indication of the channel response 202 to a first demodulator 210 (a.k.a., primary demodulator 210). In various embodiments, channel response 202 may be represented in various ways, such as by a channel transfer function matrix.

In some embodiments, primary demodulator 210 may correspond to a complex demodulator for demodulating (I, Q) samples 200. Such a complex demodulation may be sensitive to channel response 202. For example, primary demodulator 210 may be implemented using various existing complex demodulators, which may use channel response 202 to equalize the burst data, demodulate the equalized data, and output a sequence of soft bit values. In various embodiments, primary demodulator 210 may perform an MLSE, DFSE or MAP type algorithm for equalization and demodulation. Because of its complex functionality, primary demodulator 210 may require more processing and/or battery power to execute than a simpler demodulator.

According to the illustrated embodiment, primary demodulator 210 outputs a sequence of soft bits 212 (referred to herein as "primary" soft bits because they are output from the primary demodulator 210). The primary soft bits 212 may correspond to the demodulated soft bits from a burst of signal 110. For example, in GSM, the primary demodulator may output a sequence of 116 soft bits. The primary soft bit sequence 212 may be passed to soft bit combiner 220 for consideration in light of soft bits output from one or more other demodulators (e.g., secondary demodulator 215).

According to the illustrated embodiment, receiving device 120 includes a second demodulator 215 (a.k.a., secondary demodulator 215). As explained above, secondary demodulator 215 may be implemented to be one that is simpler than primary demodulator 210. Secondary demodulator 215 may also be complementary to primary demodulator 210 because it performs well in scenarios where primary demodulator 210 performs poorly (i.e., uses a demodulation function/model that is at least somewhat orthogonal to that used by primary demodulator 210). For example, secondary demodulator may perform demodulation according to a model that is insensitive to channel estimation output, can tolerate some amount of clipping or saturation, may tolerate amplitude fluctuation, and/or other conditions to which the accuracy of the primary demodulator results may be sensitive.

In the embodiment of FIG. 2, secondary demodulator 215 is configured to output a secondary sequence of soft bits 217. Whereas primary soft bits 212 may correspond to the primary demodulator's interpretation of (I, Q) samples 200, secondary soft bits 217 correspond to the secondary demodulator's interpretation of those samples. For example, in GSM where each burst comprises (I, Q) samples representing 116 phase shifts, primary soft bits 212 and secondary soft bits 217 may each include a respective sequence of 116 soft bits, each mapped to a respective one of the 116 phase changes.

As shown in FIG. 2, soft bit combiner 220 may be configured to receive secondary soft bits 217 in addition to primary soft bits 212. Soft bit combiner 220 may be configured to use the primary and secondary soft bits to create a third sequence of soft bits, such as output soft bits 222. As discussed above, in some embodiments, soft bit combiner 222 may be implemented as part of soft bit logic 128 of FIG. 1. Soft bit combiner 220 may be configured to produce output soft bits 222 by considering both primary soft bits 212 and secondary soft bits 217. Soft bit combiner 220 may be configured to assign different weights to results from the two demodulators (e.g., assign more weight to primary soft bits 212 than to the secondary soft bits 217).

In the illustrated embodiment, convolution decoder 130 receives output soft bits 222 and produces hard bits 224. Decoder 130 of FIG. 2 may correspond to decoder 130 of FIG. 1. As discussed above, decoder 130 may be implemented as a legacy decoder, such as a Viterbi decoder.

Figure 3:
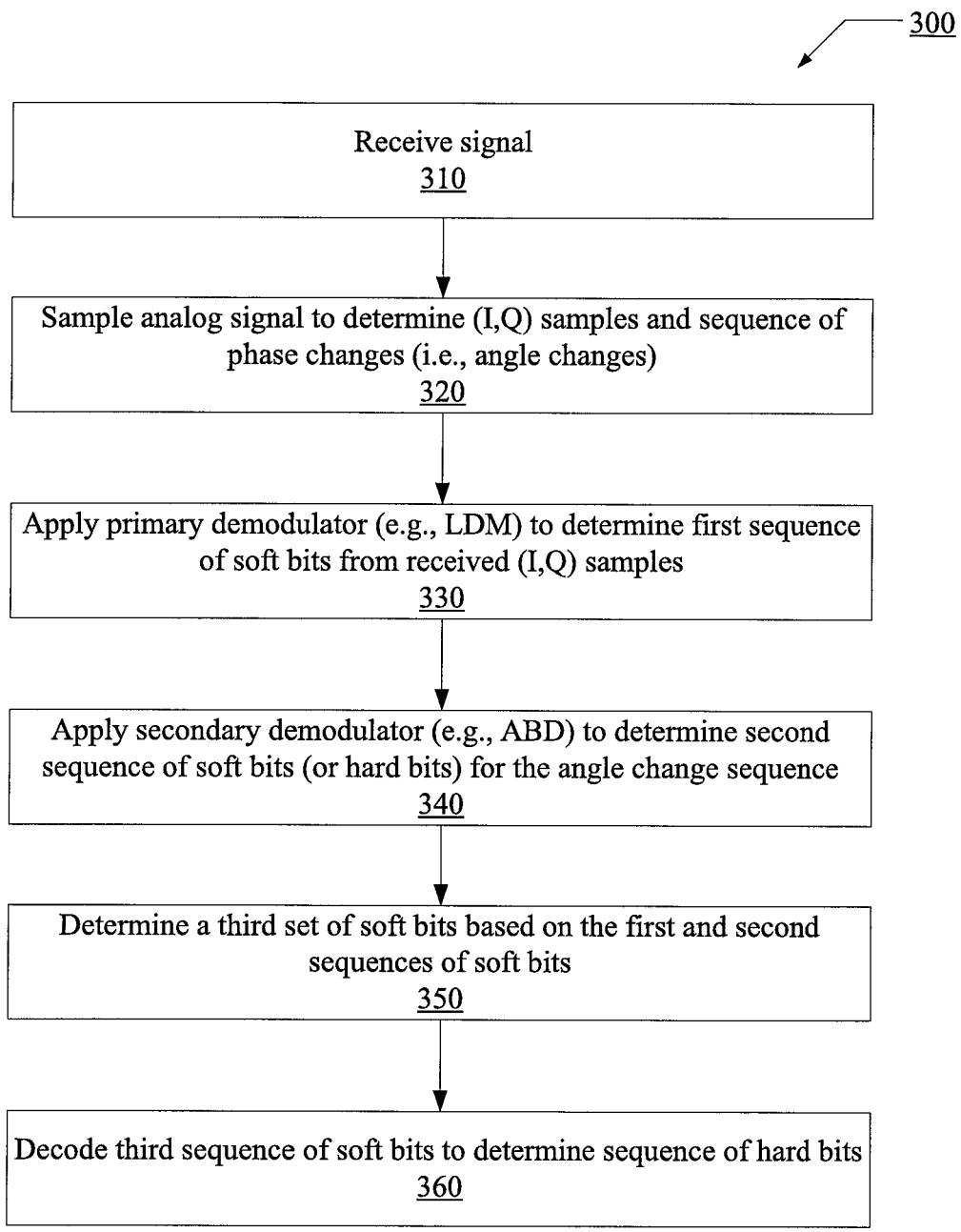
FIG. 3. is a flow chart illustrating a process according to some embodiments.

FIG. 3 is a flow diagram illustrating a general method for performing demodulation using diversity combining, according to some embodiments. Method 300 of FIG. 3 may be performed by a receiving unit, such as 120 of FIG. 1 and FIG. 2.

Method 300 begins in 310, where the receiver receives a signal, such as radio signal 110. The receiver may use an RF unit (e.g., 122) to receive such a signal.

In 320, the receiver samples the analog signals to determine a sequence of complex sample pairs (e.g., samples 210). From those complex sample pairs, the receiver may determine a sequence of phase changes, each representing a respective communicated bit value. For example, in 320 a GSM receiver may determine the 116 phase changes represented in a given burst of the signal received in 310.

In 330, the receiver applies a primary demodulator to the signal in order to determine a first sequence of soft bits (i.e., primary soft bits). The primary demodulator of step 330 may correspond to a complex demodulator, such as a legacy demodulator (e.g. MAP, DFSE or MLSE demodulator). The primary demodulator applied in 330 may correspond to primary demodulator 210 and may be sensitive to channel estimation.

In 340, the receiver applies a secondary demodulator to the signal in order to determine a second sequence of soft bits (i.e., secondary soft bits). The secondary demodulator of step 340 may correspond to secondary demodulator 215. The secondary demodulator may be a simpler demodulator that operates on principles/models that are orthogonal to those used by the primary demodulator of step 330, such as based on angle based demodulation, as described further below.

In 350, the receiver uses the first sequence of soft bits (i.e., primary soft bits determined in 330) and the second sequence of soft bits (i.e., secondary soft bits determined in 340) to determines a third sequence of soft (i.e., output soft bits). Step 350 may be performed by a soft bit combiner (e.g., soft bit combiner 222 of FIG. 2) and the output soft bits generated in 350 may correspond to output soft bits 222 of FIG. 2. Each of the output soft bits from 350 may indicate a respective bit value and confidence level.

In 360, the output soft bits created in 350 may be decoded into a sequence of hard bits corresponding to the sequence of phase changes identified in 320. In some embodiments, step 360 may be performed by a decoder, such as convolution decoder 130 of FIG. 1 and FIG. 2. The sequence of hard bits produced in step 360 may correspond to hard bits 224 of FIG. 2.

In various embodiments, the primary and secondary demodulators may operate completely independently of one another or may have some level of dependence. In embodiments where the primary and secondary demodulators operate completely independently, steps 330 and 340 may be performed completely in parallel. In other embodiments, the primary demodulator may provide some guidance to the secondary demodulator, which the secondary demodulator may use to improve the accuracy of the secondary soft bits. Such optional guidance is denoted in FIG. 2 using the dashed line labeled guidance data 214. Guidance data 214 may comprise any indication(s) of results from the primary demodulator, such as the primary soft bits themselves or other data that the secondary demodulator may use to improve the secondary soft bit quality. In such embodiments, the execution of the primary and secondary demodulators in steps 330 and 340 respectively, may be at least partially serial. However, a substantial portion of the demodulators' functionality may be overlapped using pipelining techniques.

Figure 4:
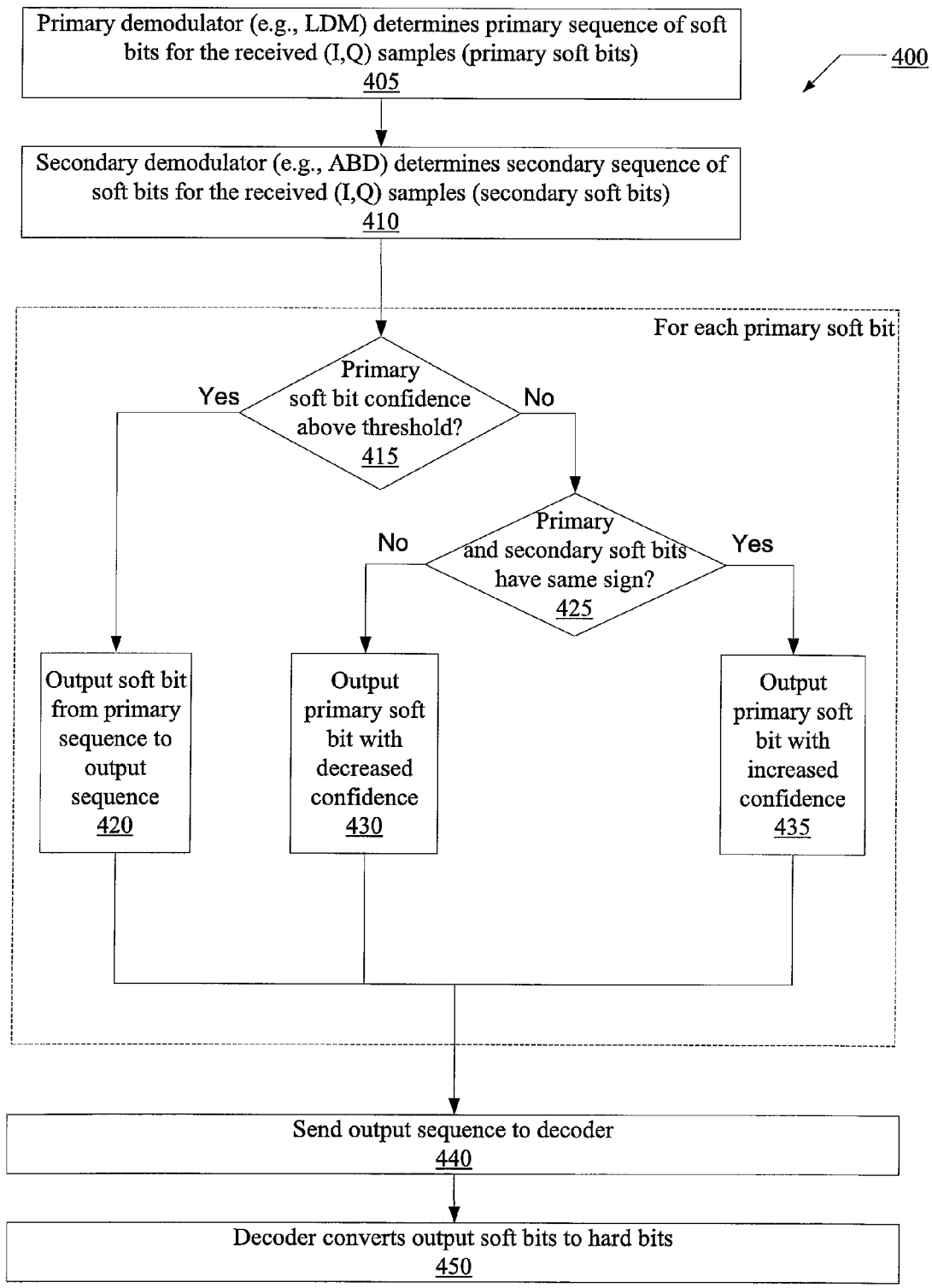
FIG. 4. is a flow chart illustrating a process according to some embodiments.

FIG. 4 is a flow diagram illustrating a detailed method for performing demodulation using diversity combining, according to some embodiments. Method 400 of FIG. 4 may correspond to a more detailed view of method 300 in FIG. 3. As method 300, method 400 may be performed by a receiving unit, such as 120 of FIG. 1 and FIG. 2.

Method 400 begins when the primary demodulator determines a primary sequence of soft bits, as in 405, and the secondary demodulator determines a secondary sequence of soft bits, as in 410. Steps 405 and 410 may correspond to steps 320 and 330 respectively and may be performed at least substantially in parallel. As discussed above, the primary and secondary sequences have the same number of soft bits (e.g., 116 in GSM). A soft bit at a given index of the primary sequence may correspond to the soft bit at the same index of the secondary sequence.

The receiver may combine the primary and secondary soft bits as shown in combining steps 415 to 435. Combining steps 415 to 435 may be performed for each primary soft bit. In 415, the receiver first decides whether the primary soft bit confidence is above a given confidence threshold. If the primary soft bit confidence is above the given threshold (as indicated by the affirmative exit from 415), then the primary demodulator is very certain of the result and the receiver uses the primary soft bit in the output sequence, as in 420. That is, the soft bit at index i of the output sequence will match the soft bit at index i of the primary sequence.

If the confidence of the primary soft bit is not above the given threshold (as indicated by the negative exit from 415, then the receiver considers the secondary soft bit at the same index. In 425, the receiver determines whether the primary and secondary soft bits have the same sign (i.e., same bit value). If the signs of the two soft bits agree (as indicated by the affirmative exit from 425), then in 435, the receiver places an output soft bit into the output sequence, where the output soft bit has the same sign as the primary soft bit but an even higher confidence than the primary soft bit. Thus, when the primary and secondary soft bits at a given index agree, the receiver boosts the primary soft bit confidence for that soft bit in the output sequence. Conversely, if the signs do not agree (as indicated by the negative exit from 425), then in 430, the receiver places an output soft bit into the output sequence, where the output soft bit has the same sign as the primary soft bit but a lower confidence than the primary soft bit. Thus, when the primary and secondary soft bits at a given index disagree, the receiver lowers the primary soft bit confidence for that soft bit in the output sequence.

In various embodiments, the receiver may boost and/or lower the primary soft bit confidence by pre-defined or dynamic amounts. For example, when the primary and secondary soft bits agree, the output soft bit may correspond to the primary soft bit confidence boosted by 33%. However, if the primary and secondary soft bits disagree, the output soft bit may correspond to the primary soft bit confidence reduced by 90%. In other embodiments, the boost or reduction may vary depending on the extent to which the primary and secondary confidences disagree. For example, a primary confidence may be boosted by a fixed percentage of the secondary confidence.

By comparing each of the corresponding primary and secondary soft bits in the primary and secondary sequences (as in 415-435), the receiver is able to produce a final output sequence of soft bits. In 440, the receiver sends the output sequence of soft bits to the decoder. In 450, the decoder converts the output sequence of soft bits to a final sequence of hard bits.

In various embodiments, different portions of combining steps 415-435 may be implemented by different portions of a receiver. For example, in some embodiments, all of the combining steps may be implemented by a soft bit combiner, such as 222. Such a soft bit combiner may accept as input the primary and secondary sequences and produce the output sequence by comparing the soft bits at each index of the two sequences. In some embodiments, the secondary demodulator itself may perform some of the combining logic. For example, in some embodiments, the primary demodulator may send the primary soft bit-sequence to the secondary demodulator (e.g., as guidance data 214). In such an embodiment, the secondary demodulator may make decision 415 by replacing any secondary soft bit whose corresponding primary bit has a confidence above the threshold. Thus, the secondary soft bits output from the secondary demodulator will agree with all primary soft bits whose confidence is above a given threshold. The primary and secondary soft bit sequences may then be passed to a soft bit combiner for steps 425 to 435. In various other embodiments, combining steps 415-435 may be performed by one or more other components.

Angle Based Demodulation (ABD)

In some embodiments, secondary demodulator 215 may be an angle based demodulator (ADB). That is, secondary demodulator 215 may perform its demodulation function using an angle based demodulation process.

Figure 5:
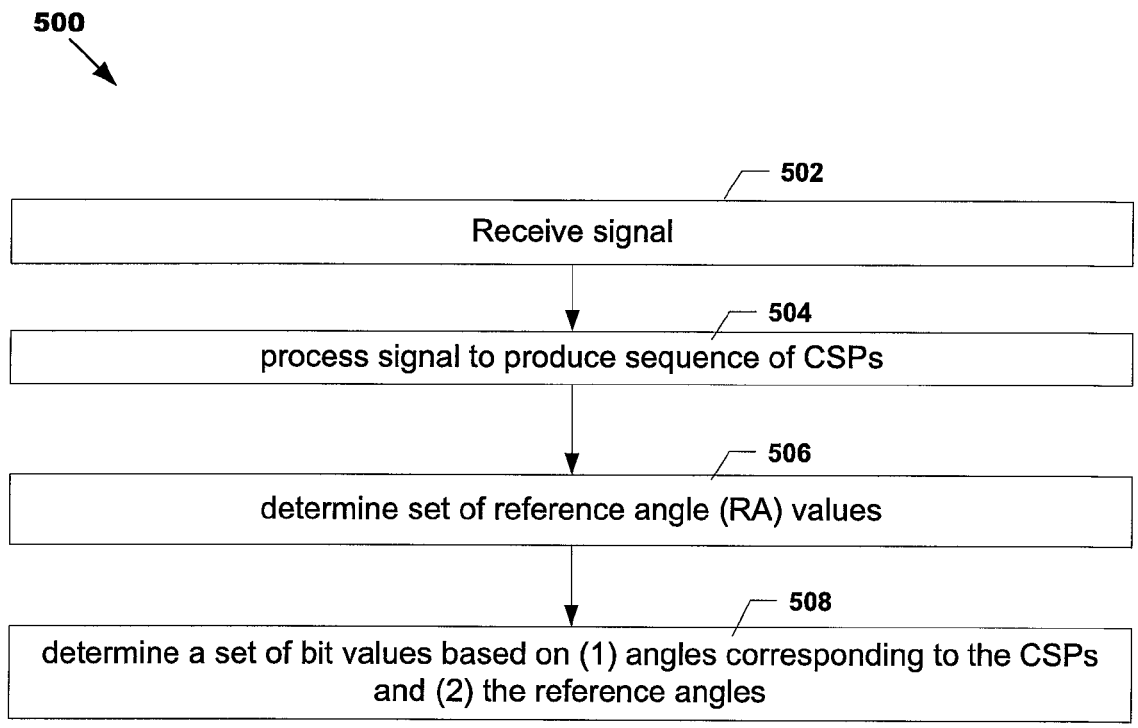
FIG. 5 is a flow chart illustrating an angle based demodulator process according to some embodiments.

FIG. 5 is a flow chart illustrating an angle based demodulation process 500 according to some embodiments. Process 500 may begin in step 502, where RF unit 122 of receiving device 120 receives a modulated signal transmitted from transmission device 100. In step 504, RF unit 122 processes the signal to produce a sequence of complex sample pairs (CSPs) (i.e., an I sample and a Q sample). Each CSP has a corresponding angle (A) (i.e., A[n] corresponds to CSP[n], where A[n]=arctan(Q[n]/I[n])). In step 506, demodulator 215 determines a set of reference angle (RA) values. In step 508, demodulator 215 determines a set of bit values (soft and/or hard bit values) based on (1), the angles corresponding to the CSPs and (2) the RA values.

Angle based demodulation process 500 can be used in a demodulator for demodulating a phase modulated signal (e.g., MSK modulated signal, GMSK modulated signal, etc.). GMSK modulation is similar to MSK and FSK, but, to limit the transmission bandwidth, the data to be transmitted is first passed through a Gaussian Filter and then I,Q modulated.

In polar form, a GMSK signal can be represented as I=R*cos(A) and Q=R*sin(A). So, at any instant the (I,Q) point can be written as =R*tan(A). The angle jumps from present (A) to next position A1 or A2 based on the input data stream to the modulator. In GMSK, R is constant, so the angle jumps in a constant radius circle. In MSK these jumps at an angle +90 or −90 degree always. But in GMSK it is not always +90 or −90 degrees, as the data signal passes first through the Gaussian filter first (e.g. low pass filtered). So, the angle jump for GMSK depends on the past 4 bits plus the bit to be transmitted. Based on the past 4 bits the angle may jump by +90, −90, +27, −27, +58 or −58 degree angle in ideal case (that means when I and Q values are taken at the middle of the modulated GMSK pulse). GMSK modulated pulse looks like a bell shaped normal distribution curve. Accordingly, if one knows the angle jump corresponding to a particular bit and also knows the immediate past four bits (e.g., knows that the past four bits were 0101), then one can determine the value of the particular bit. Angle based demodulation process 500 exploits this feature.

As mentioned above, in GSMK, the amplitude of the carrier signal is kept constant and the bits of the digital modulation data are used to increase or decrease the phase by a fixed angle (90 degrees). The rate of the change of the phase is limited by the means of a Gaussian (low-pass) filter. The filter effectively restricts the bandwidth of the transmitted signal in cost of introducing a small interference of the modulating bits (inter-symbol interference (ISI)). In theory, each bit influences the phase at any time in the past and in the future. However, this affect is small—a few bits away in the past. A few bits later the phase gets increased or decreased by a nearly constant angle. It means, in a long period the bits have a cumulative (summed) affect on the phase, and the influence of each bit is steady outside a short transient time interval. Theoretically, it is noticed that the change of the angle based on the next input data bit (as '1' or '0') is constant.

The input to a GMSK modulator is an input data bit stream "data[ ]" (a.k.a., the normal burst data). This data is GMSK modulated. The output from the modulator will be an I and a Q signal. These are then RF up converted and sent via the air. In an ideal case, after the modulation, we have complex (I,Q) values. On the receiver side, 156 bits of I and 156 bits of Q are generally fed to the receiver. For a 2× over samples receiver this will 156*2 I's and 156*2 Qs.

If we compute the angle (A) for each generated (I,Q) pair, then A[n]=arctan(Q[n]/I[n]). This angle value is dependent on the input bit sequence used. As explained earlier, generally the angle (A) depends on the last 4 bits and the following bit. For example, if the last 4 bits are '0000' and the following (e.g., bit[n+1]) pushed to the modulator has a value of 0, then the angle jump from the last computed angle will be equal to a certain reference angle RA[1] (e.g., 90 degrees) taken from a set of reference angles RA[N] (e.g., 58, −58, 90, 27, −27) (i.e., A[n+1]=A[n]+RA[1]), where RA[1] is associated with the bit sequence 00000. Each RA in the set is associated with a unique set of bit sequences of length 5. Similarly, if bit[n+1]=1, then the jump from the last angle will be equal to a different a reference angle RA[2] taken from the set of reference angles RA[N] (e.g., A[n+1]=A[n]+RA[2]), where RA[2] is associated with the bit sequence 00001. On the receiver side, if the sampling instant is located in the middle of the GMSK pulse, then the set of reference angle values will be ={58, −58, 90, +27, −27}, where each reference angle value is associated with different set of bit sequences of length 5. The sampling instant, however, can be anywhere. Accordingly, in some embodiments, the set of reference angle values are dynamically determined.

As seen from the above, if the past 4 bits are known (i.e., bit[n−3], bit[n−2], bit[n−1], and bit[n] are known) and the set of reference angle values are known, then we can select the value for bit[n+1] by: (1) computing the angle difference AD[n+1] associated with bit[n+1] (where AD[n+1]=A[n+1]−A[n]); (2) determining a first error value associated with bit value 0 by comparing AD[n+1] to the reference angle value associated with the following bit sequence {bit[n−3], bit[n−2], bit[n−1], bit[n], 0}; (3) determining a second error value associated with bit value 1 by comparing AD[n+1] to the reference angle value associated with the following bit sequence {bit[n−3], bit[n−2], bit[n−1], bit[n], 1}; (4) comparing the first error value with the second error value to find the minimum error value; and (5) selecting the value for bit[n+1] to be equal to the bit value associated with the minimum error value. This process is repeated for the each of the other following bits (i.e., bit[n+2], bit[n+3], . . . )

To improve the bit decision process, rather than compare all of the possible error values associated with a bit sequence of length one (1), the process compares all of the possible error values associated with a bit sequence of length four (4). As illustrated above, with a bit sequence of length one, there are a total of 2 possible cumulative error values—a first error value associated with a bit value of 0 and a second error value associated with a bit value of 1. With a bit sequence of length four, however, there are a total of $2^4$ (i.e., 16) possible cumulative error values because a bit sequence of length four can produce 16 unique bit sequences. The bit sequence having the "minimum" cumulative error value is chosen as the winner, and the bit to be decided is given the value of the first bit in the bit sequence. So, when the previous four bits are known, we can compute an error by computing the difference between the received angle difference and the appropriate reference angle value over next four samples (i.e., for next $2^4$=16 possible bit sequences). The bit sequence (a.k.a., "path") that provides lowest cumulative error is selected as the winning path. Based on the winning path, bit[n+1] bit is decided. This is depicted in FIG. 6.

Figure 6:
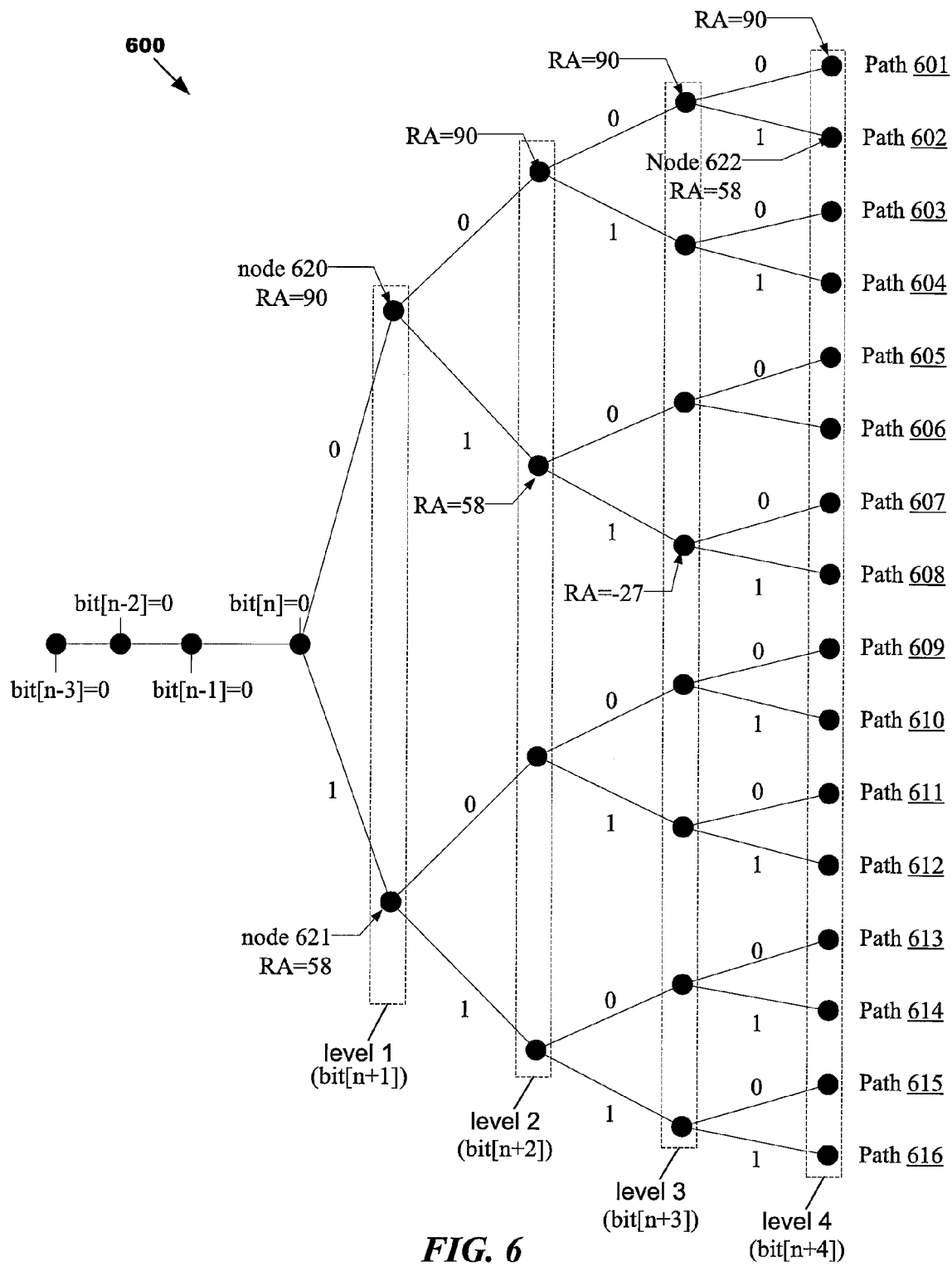
FIG. 6 illustrates a tree structure according to an embodiment.

FIG. 6 illustrates a tree structure 600 having four levels (levels 1-4), where each level is associated with a different bit. Specifically, level 1 of tree 600 corresponds with bit[n+1], level 2 corresponds with bit[n+2], level 3 corresponds with bit[n+3], and level 4 corresponds with bit[n+4]. As shown in FIG. 6, the past 4 bits (e.g., bit[n−3], bit[n−2], bit[n−1], bit[n]) are known (e.g., are already decoded). In the example shown, each of the known bits is equal to 0. The following bit, bit[n+1], is unknown and need needs to be determined.

Each node in tree 600 (i.e., each black circle) is associated with (i) a bit sequence of at least length 2, (ii) a reference angle (RA) value that corresponds to the bit sequence, and (iii) a bit (i.e., it is associated with the bit associated with the level in which the node is found). For example, node 620 is associated with (i) the following five bit sequence: 00000, where the first four bits of the five bit sequence corresponds to bit[n−3], bit[n−2], bit[n−1], bit[n], respectively, and the last bit corresponds to an assumed value of 0 for bit[n+1], (ii) the RA value that corresponds with bit sequence 00000 (i.e., 90), and (iii) bit[n+1]. Similarly, node 621 is associated with (i) the following five bit sequence: 00001, where the first four bits of the five bit sequence corresponds to bit[n−3], bit[n−2], bit[n−1], bit[n], respectively, and the last bit corresponds to an assumed value of 1 for bit[n+1], (ii) the RA value that corresponds with bit sequence 00001 (i.e., 58), and (iii) bit[n+1]. Likewise, node 622 is associated with (i) an RA value of 58, (ii) the following five bit sequence: 00001, where the five bits of the five bit sequence corresponds to bit[n], bit[n+1], bit[n+2], bit[n+3], and bit[n+4] respectively, where the values for bit[n+1], bit[n+2], bit[n+3], and bit[n+4] are assumed values, and (iii) bit[n+4].

As further shown in FIG. 6, there are total 16 possible paths (i.e., paths 601-616), where each path is associated with a unique sequence of four bits (i.e., an assumed value for bit[n+1], bit[n+2], bit[n+3], and bit[n+4], respectively). For example, path 601 is associated with bit sequence 0000, path 602 is associated with bit sequence 0001, path 615 is associated with bit sequence 1110, and path 616 is associated with bit sequence 1111.

The bit value for bit[n+1] is determined by determining the cumulative error associated with each path, then determining which path has the "minimum" cumulative error, and then setting the value of bit[n+1] equal to the value of the first bit of the four bit sequence associated with the path having the minimum cumulative error. To determine the cumulative error for each path, an error value is calculated for each node in the path and then the error values are summed. To determine the error value for any given node, one may determine the difference between (a) the RA value associated with the node and (b) an angle difference value determined based on the received signal. Specifically, if the node in question is associated with bit[x], then one may determine the error value for the node by determine the difference between (a) the RA value associated with the node and a value that is a function of the difference between A[x+1] and A[x]. Now once the bit [n+1] is detected, use bit[n−2], bit[n−1], bit[n] and bit[n+1] as past detected sequence, and try to decode the next bit (i.e., bit[n+2] by repeating the same process. Also, once the bit value for bit[x] is determined, a soft bit value can be determined, where the sign of the bit will depend on whether a 0 or 1 was detected and the absolute value of the soft bit value may be a function of the error value associated with the winning path.

Figure 7:
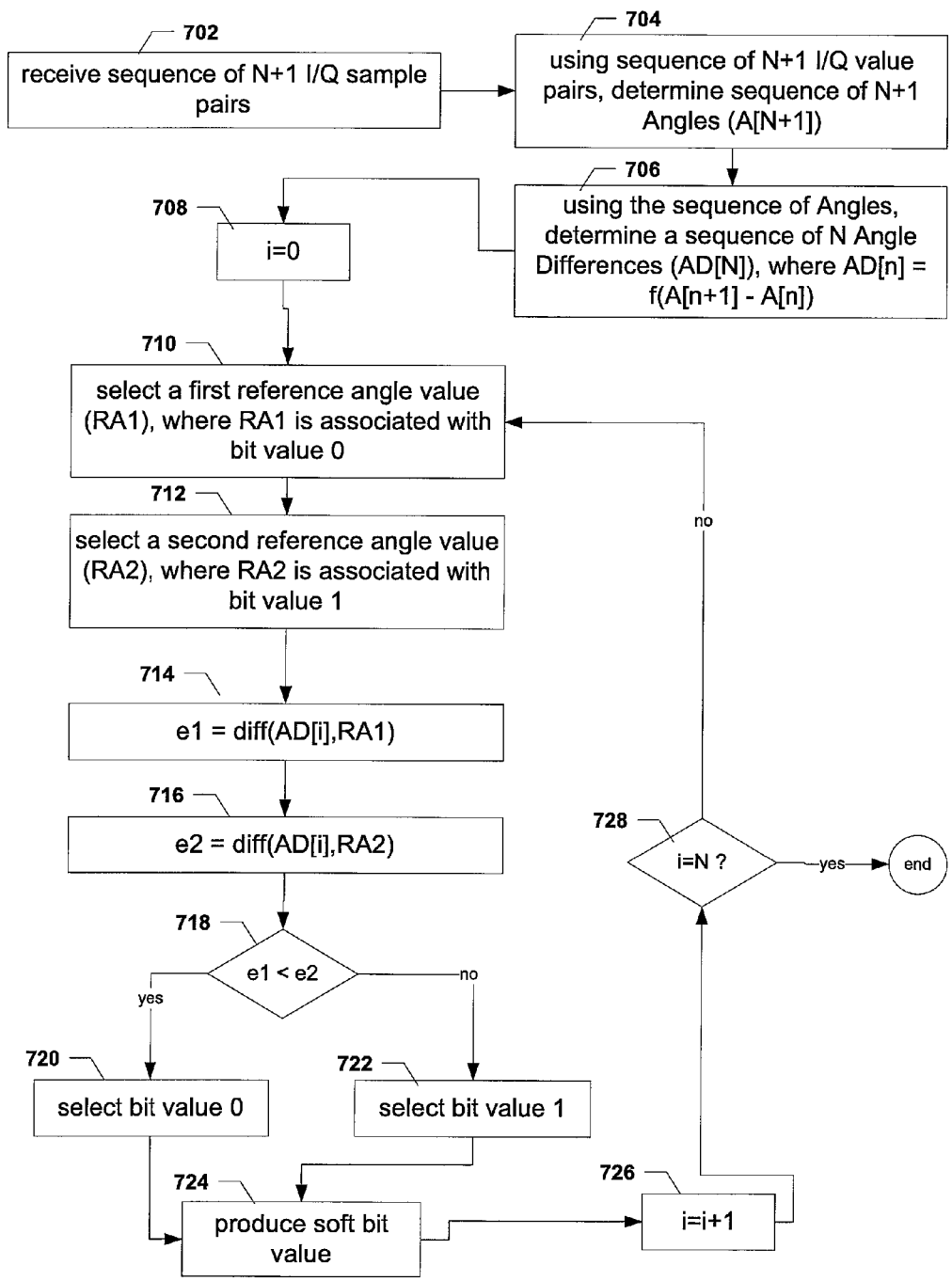
FIG. 7 is a flow chart illustrating an angle based demodulator process according to some embodiments.

FIG. 7 is a flow chart illustrating a process 700, performed by demodulator 215, for producing a sequence of N soft bits (or N hard bits) from a received modulated signal, where demodulator 215 uses a tree 600 having only a single level (i.e., only level 1). In such an embodiment, tree 600 has only two possible paths: a first path for bit value 0 and a second path for bit value 1.

Process 700 begins in step 702, where demodulator 215 receives from RF unit 122 a sequence of N+1 I/Q sample pairs. In step 704, demodulator 215 uses the sequence of N+1 I/Q values pairs to determine a sequence of N+1 angle values (A[N+1]). In step 706, demodulator 215 uses A[N+1] to determine a sequence of N angle difference values (AD[N]), where AD[n]=a function of (A[n+1]−A[n]). For example, in some embodiments, AD[n] is determined by modulo-PI correcting (A[n+1]−A[n]). For instance, in some embodiments, if both A[n+1] and A[n] are greater than zero or if both A[n+1] and A[n] are less than zero, then AD[n] is set equal to (A[n+1]−A[n])*180/π, otherwise AD[n] is set equal to (A[n+1]+180−A[n])*180/π, wherein 180/π equals approximately 57.3.

In step 708, demodulator 215 sets a counter (i) to zero. In step 710, demodulator 215 selects a first reference angle value (RA1), where RA1 is associated with bit value 0. In step 712, demodulator 215 selects a second reference angle value (RA2), where RA2 is associated with bit value 1. In step 714, demodulator 215 determines a first error value (e1), where e1 is a function of the difference between AD[i] and RA1. In step 716, demodulator 215 determines a second error value (e2), where e2 is a function of the difference between AD[i] and RA2. In step 718, determines the minimum error value (e.g., determines whether e1<e2). If e1 is the minimum error value, then demodulator 215 selects bit value 0 (step 720) to the value to assign to bit[i], otherwise it selects bit value 1 (step 718) to assign to bit[i]. In step 724, demodulator 215 produces a soft bit value. For example, in some embodiments demodulator 215 produces a soft bit value (sbv) according to the following equation: sbv=sv*1024/Abs_Val(min(e1,e2)), where sv equals 1 if the value of 1 is assigned to bit[i], otherwise sv equals −1.

In step 726, demodulator 215 increments the counter (e.g., i=i+1). In step 728, demodulator 215 determines whether the index i=N. If so, process 700 ends, otherwise flow returns to step 710.

Figure 8:
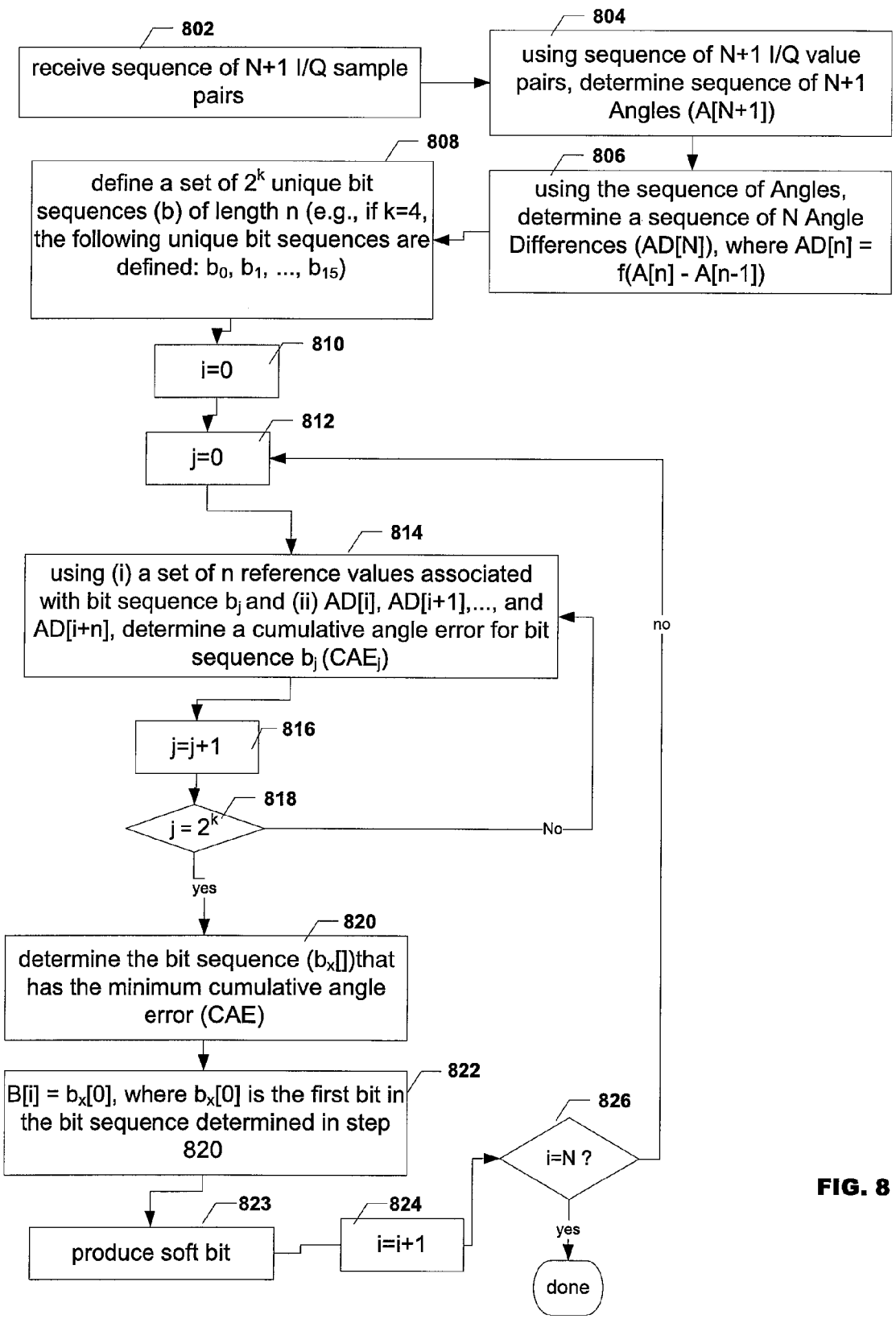
FIG. 8 is a flow chart illustrating an angle based demodulator process according to some embodiments.

FIG. 8 is a flow chart illustrating a process 800, performed by demodulator 215, for producing a sequence of N soft bits (or N hard bits) from a received modulated signal, where demodulator 215 uses a tree 600 having k levels (e.g., k=4). In such an embodiment, tree 600 has $2^k$ possible paths: each path corresponding to a unique bit sequence of length k. Process 800 begins in step 802, where demodulator 215 receives from RF unit 122 a sequence of N+1 I/Q sample pairs. In step 804, demodulator 215 uses the sequence of N+1 I/Q values pairs to determine a sequence of N+1 angle values (A[N+1]). In step 806, demodulator 215 uses A[N+1] to determine a sequence of N angle difference values (AD[N]), where AD[n]=a function of (A[n+1]−A[n]). In step 808, demodulator 215 defines a set of $2^k$ unique bit sequences of length k (i.e., b[$2^k$][k]). In steps 810 and 812, demodulator 215 initializes two counters i and j, respectively. In step 814, demodulator 215 uses (i) a set of k references values associated with bit sequence b[j] and (ii) the following angle difference values AD[i], AD[i+1], AD[i+2], . . . , and AD[i+k] to determine a cumulative angle error for bit sequence b[j] (CAE[j]). In step 816, demodulator 215 increments counter j (e.g., j=j+1). In step 818, demodulator 215 determines whether j=$2^k$. If not, the process returns to step 814, otherwise it proceeds to step 820. In step 820, demodulator 215 determines the bit sequence that has the minimum cumulative angle error. In step 822, demodulator 215 sets the transmitted bit sequence B[i] equal to the value of the first bit of the bit sequence determined in step 820. In step 823, demodulator 215 produces a soft bit value (see e.g., step 724). In step 824, demodulator 215 increments the counter i. In step 826, demodulator 215 determines whether i=N. If so, the process ends, otherwise it proceeds to step 812.

Figure 9:
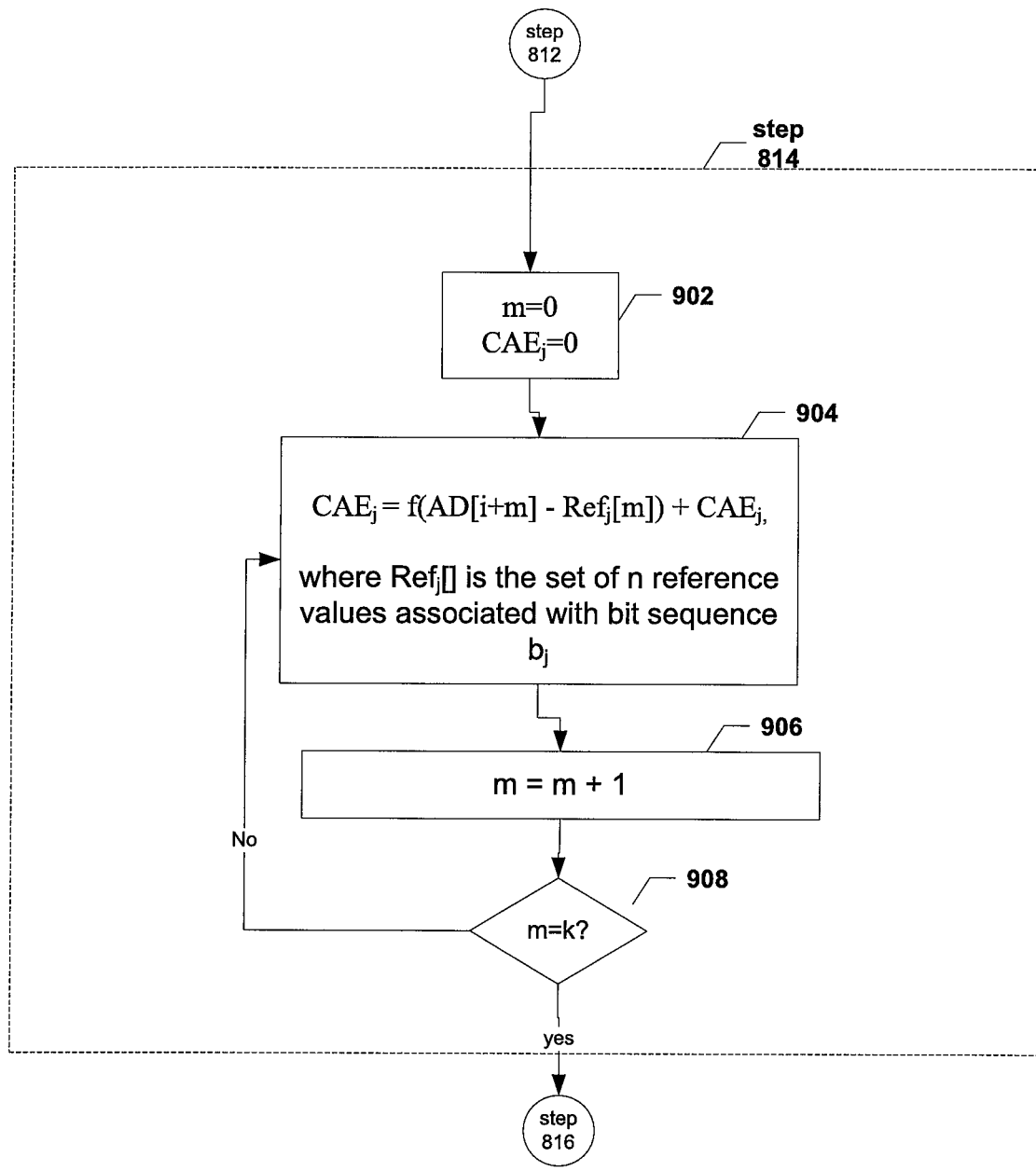
FIG. 9 is a flow chart illustrating a step of an angle based demodulator process according to some embodiments.

FIG. 9 illustrates a process 900 for performing step 814 of process 800. Process 900 may begin in step 902, where demodulator 215 initializes variables m and CAE[j] (e.g., m=0 and CAE[j]=0). In step 904, demodulator 215 sets CAE[j] equal to CAE[j] plus a values that is a function of the difference between AD[i+m] and Ref[j][m], where Ref[j][m] is the $m^{th}$ reference angle value associated with bit sequence b[j]. As described earlier, there are a total of k reference angle values associated with each bit sequence b[j]. In step 906, demodulator 215 increments m. In step 908, demodulator 215 determines whether m=k. If m=k, then the process proceeds to step 816, otherwise it returns to step 904.

As discussed above, data may be transmitted by transmitting device 100 in bursts. For example, if transmitting device 100 transmits data according to the GSM specification, then transmitting device 100 may transmit a burst of data containing about 156 bits. In GSM, the data burst contains a 26 bit training sequence that is known to receiving device 120 (the training sequence aids receiving device 120 in demodulating the signal). As the training sequence (TSC) is known, so when this known 26 bits sequence is passed through the modulator, then what will be angle differences between the two consecutive (I,Q) sample pairs at the output of the modulator are also known and can also be computed through the mathematical model. Then out of these (26-1) known TSC angle differences the middle 20 values are chosen. And these are matched with the received angle difference values. Wherever correlation is found then that is considered as matched with the TSC position. From this, the start position of the TSC in the burst is found.

As discussed above, demodulator 215 determines a set of reference values RA values (see step 506). In some embodiments, the set of RA values is determined on every burst. Ideally, if a GMSK modulated signal is sampled at the middle of the modulated pulse, then the RA values will be constant and will be {58, −58, 90, +27, −27} based on the input bit stream. But, if we sample a perfect GMSK signal at instants (nT), where, n=0 . . . , N and T is the period of the signal, or at instants (nT+eps*T), where eps is a fraction of the signal period, 0<eps<1, n=0, . . . , N, then the set of RA values will not be same always as given earlier because the phase difference depends upon the values of the phase pulse at different times. Also, at the receiver the value of eps (e.g. fraction of the signal period T) is random, so the angle differences are indeed fixed, but dependent upon the value of eps. That's why for proper operation, the set of RA values may need to be computed depending on the sampling instant. Below is described a method, according to some embodiments, for determining the set of RA values.

During the operation, the receiver knows about the TSC that is contained in the received burst of data. Also, it is known around what location the TSC modulated data is expected in the burst. When this known TSC data is passed through the GMSK modulator, based on that TSC data pattern, it is very easy to find out the expected angle difference (between two consecutive modulated I,Q pairs). Then each time the burst is received, we know the expected angles at those different locations of the sample positions in the received burst around the TSC location. Then an average angle difference value (computing the average of all expected similar angles values over the TSC period) is chosen for that angle setting and defined in the angle set. Like this, it is done for −58, 58, 90, 27, −27 angles new set of values. But before doing this the sync position e.g. the start of TSC position is adjusted properly. For example—if TSC#5 is used, then the data sequence for TSC#5 is {0,1,0,0,1,1,1,0,1,0,1,1,0,0,0,0,0,1,0,0,1,1,1,0,1,0}. Now, if that is passed through the ideal GMSK modulator and sampled at the middle of the GMSK pulse e.g. in ideal case, then +27 degree angles will appear in the location=>62, 70 and 78 (where 60 is the sync/TSC start position) in the burst. Now, we will take those positions from each received sync aligned burst and then average it out for getting the angle difference for 27 degree. Like, this it will be done for 58, −58 and −27 angles from the prior location of appearance. The same needs to done if other TSC number is used. The same above method is extended to compute the sync position as well. There are two options, the sync position found from the complex channel estimator module (another demodulator) can be used as an input here to adjust the start position of the TSC, and otherwise this same method as discussed above is extended to find out the sync position. This is computed by estimating the sum of the differences between the expected angle-differences and the received angle-differences for different positions (56 to 64). Whichever position gives lowest error that is chosen as start of sync position.

Figure 10:
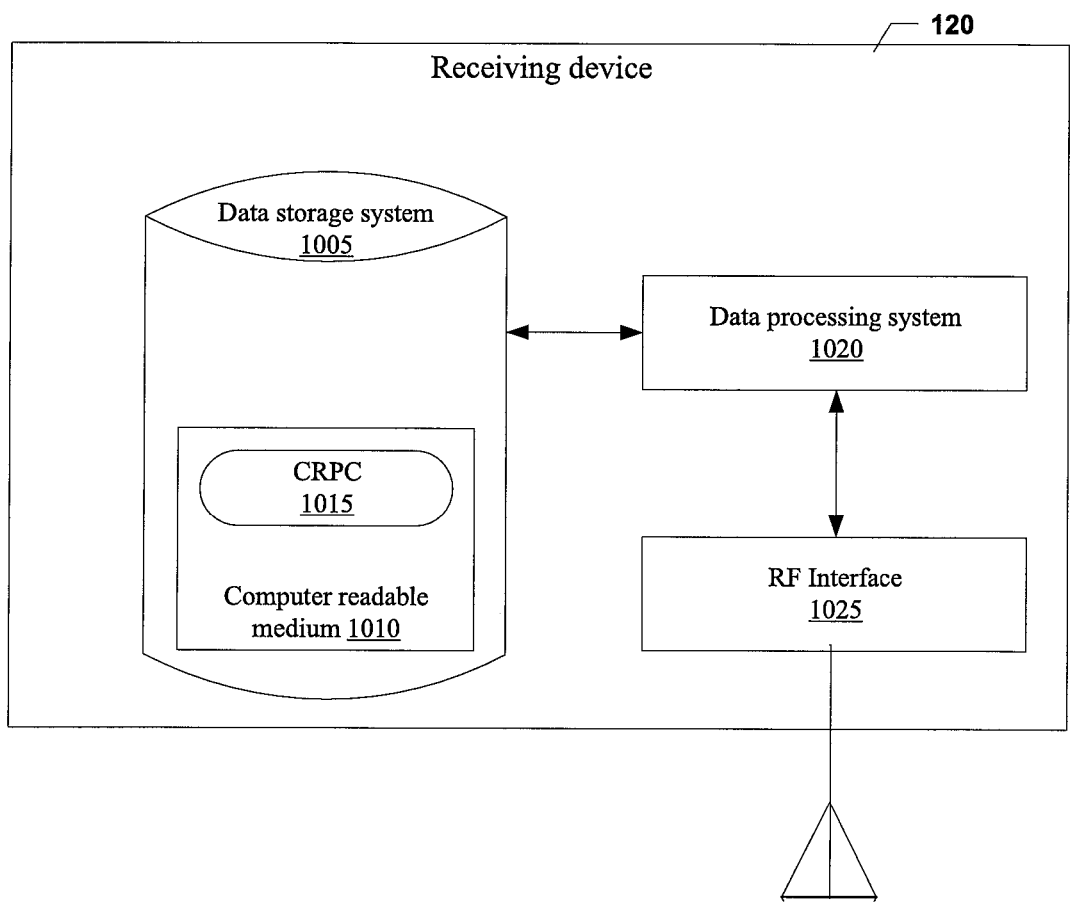
FIG. 10 is a block diagram illustrating components of a receiving device, according to some embodiments.

FIG. 10 illustrates a possible implementation for at least some components of receiving device 120 according to some embodiments of receiving device 120. As shown in FIG. 10, receiving device 120 may include: a data processing system 1020, which may include one or more microprocessors and/or one or more circuits, such as an application specific integrated circuit (ASIC), Field-programmable gate arrays (FPGAs), etc; an RF interface 1025 coupled to an antenna for receiving wireless signals; data storage system 1005, which may include one or more non-volatile storage devices and/or one or more volatile storage devices (e.g., random access memory (RAM)). In embodiments where data processing system 1020 includes a microprocessor, a computer program product may be provided, which computer program product includes: computer readable program code 1015, which implements a computer program, stored on a computer readable medium 1010, such as, but not limited, to magnetic media (e.g., a hard disk), optical media (e.g., a DVD), memory devices (e.g., random access memory), etc. In some embodiments, computer readable program code 1015 is configured such that when executed by a processor, code 1015 causes the processor to perform steps described above (e.g., steps describe above with reference to the flow charts shown in FIGS. 3-5 and 7-9).

FIG. 11 illustrates an embodiment of computer readable program code (CRPC) 1043. In the embodiment shown, CRPC 1015 includes: (1) a set of instructions 1105 for a set of instructions for using two sequences of soft bits (or a sequence of soft bits and a sequence of hard bits) to determine a new sequence of soft bits, (2) a set of instructions 1110 for determining a set of RA values and determining a sequence of bit values based on (i) angles corresponding to a sequence of CSPs and (ii) the RA value.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. An angle based demodulation method, comprising:
   a receiving device receiving a signal transmitted by a transmitting device;
   the receiving device processing the signal to produce a sequence of complex sample pairs ($CSP_1$, $CSP_2$, ..., $CSP_N$), wherein each complex sample pair ($CSP_i$) has a corresponding angle $A_i$, for i=1 ... N, where N is a positive integer;
   the receiving device determining a set of two or more reference angle (RA) values; and
   the receiving device determining a set of bit values based on the angles corresponding to the sequence of complex sample pairs and the set of RA values, wherein each bit value included in the set of bit values corresponds to an adjacent pair of CSPs, wherein the step of determining the set of bit values comprises selecting a bit value to correspond to a particular pair of said CSPs ($CSP_i$, $CSP_{i+1}$) and wherein the step of selecting a bit value to correspond to said particular pair ($CSP_i$, $CSP_{i+1}$) of said CSPs comprises:
   determining a set of two or more cumulative angle error (CAE) values, the set of CAE values comprising a minimum CAE value that is associated with a particular bit value;
   determining the minimum CAE value; and
   selecting the particular bit value associated with the minimum CAE value to correspond to said particular pair ($CSP_i$, $CSP_{i+1}$) of said CSPs.

2. The method of claim 1, wherein the step of determining the set of two or more CAE values comprises:
   determining a first cumulative angle error value ($CAEV_1$) associated with a first sequence of one or more bits, wherein determining $CAEV_1$ comprises: determining a first error value $E_1$, where $E_1$ equals a difference between $AD_i$ and $RA_1$, wherein ADi is an angle difference value representing the difference between $A_{i+1}$ and $A_i$, and $RA_1$ is a first reference angle value selected from the set of RA values; and
   determining a second cumulative angle error value ($CAEV_2$) associated with a second sequence of one or more bits, wherein determining $CAEV_2$ comprises: determining a second error value $E_2$, where $E_2$ equals a difference between $AD_i$ and $RA_2$, wherein $RA_2$ is a second reference angle value selected from the set of RA values.

3. The method of claim 2, wherein
   the step of determining $CAEV_1$ further comprises: (i) determining a third error value $E_3$, wherein $E_3$ equals a difference between $AD_{i+1}$ and $RA_3$, and (ii) summing $E_1$ and $E_3$, wherein $AD_{i+1}$ is an angle difference value representing the difference between $A_{i+2}$ and $A_{i+1}$ and $RA_3$ is a third reference angle value selected from the set of RA values; and
   the step of determining $CAEV_2$ further comprises: (i) determining a fourth error value $E_4$, where $E_4$ equals a difference between $AD_{i+1}$ and $RA_4$, and (ii) summing $E_2$ and $E_4$, wherein $RA_4$ is a fourth reference angle value selected from the set of RA values.

4. The method according to claim 1, wherein each complex sample pair includes an in-phase (I) component and a quadrature (Q) component, and the corresponding angle of each complex sample pair is defined as arctan (Q/I).

5. The method of claim 1, wherein the step of determining the set of bit values comprises selecting a bit value to correspond to a particular pair of said CSPs ($CSP_i$, $CSP_{i+1}$).

6. A communication device, comprising:
   a radio frequency (RF) unit configured to process a received signal to produce a sequence of complex sample pairs ($CSP_1$, $CSP_2$, ..., $CSP_N$), wherein each complex sample pair ($CSP_i$) has a corresponding angle $A_i$, for i=1 ... N, where N is a positive integer; and
   an angle based demodulator (ABD) coupled to the RF unit, the angle based demodulator being configured to: (1) determine a set of two or more reference angle (RA) values; and (2) determine a set of bit values based on the angles corresponding to the sequence of complex sample pairs and the set of RA values, wherein each bit value included in the set of bit values corresponds to an adjacent pair of CSPs, wherein
   the ABD is configured to determine the set of bit values by selecting a bit value to correspond to a particular pair of said CSPs ($CSP_i$, $CSP_{i+1}$), and
   the ABD is configured to select a bit value to correspond to said particular pair ($CSP_i$, $CSP_{i+1}$) of said CSPs by performing a process comprising: (1) determining a set of two or more cumulative angle error (CAE) values, the set of CAE values comprising a minimum CAE value that is associated with a particular bit value; (2) determining the minimum CAE value; and (3) selecting the particular bit value associated with the minimum CAE value to correspond to said particular pair ($CSP_i$, $CSP_{i+1}$) of said CSPs.

7. The communication device of claim 6, wherein the ABD is configured to determine the set of two or more CAE values by performing a process comprising:
   determining a first cumulative angle error value ($CAEV_1$) associated with a first sequence of one or more bits, which comprises: determining a first error value $E_1$, where $E_1$ equals a difference between $AD_i$ and $RA_1$, wherein ADi is an angle difference value representing the difference between $A_{i+1}$ and $A_i$, and $RA_1$ is a first reference angle value selected from the set of RA values; and
   determining a second cumulative angle error value ($CAEV_2$) associated with a second sequence of one or more bits, which comprises: determining a second error value $E_2$, where $E_2$ equals a difference between $AD_i$ and $RA_2$, wherein $RA_2$ is a second reference angle value selected from the set of RA values.

8. A method for demodulating and decoding a signal in a receiving device comprising a first demodulator and a second demodulator, the method comprising:
   a receiving device receiving a signal transmitted by a transmitting device;
   the receiving device processing the signal to produce a sequence of complex sample pairs (CSP-1, CSP-2, ..., CSP-X), wherein
   the first demodulator receives the sequence of CSPs and uses the received sequence of CSPs to determine a first sequence of soft bit values (sbv1[n]);
   the second demodulator receives the sequence of CSPs and uses the received sequence of CSPs to determine a second sequence of soft bit values (sbv2[n]) or a first sequence of hard bit values (hbv[n]); and determining a third sequence of soft bit values (sbv3[n]) based on (a) the first and second sequences of soft bit values or (b) the first sequence of soft bit values (sbv1[n]) and a first sequences of hard bit values (hbv[n]), wherein each soft bit value included in the first sequence of soft bit values comprises a confidence value;

the step of determining the third sequence of soft bit values (sbv3[n]), comprises:

comparing sbv1[i] with sbv2[i], for each i=1, . . . , n, where n is a positive integer, to determine whether the sign of sbv1[i] matches the sign of sbv2[i]; and increasing the confidence value of sbv1[i] by a first amount in response to determining that the sign of sbv1[i] matches the sign of sbv2[i] or decreasing the confidence value of sbv1[i] by a second amount in response to determining that the sign of sbv1[i] does not match the sign of sbv2[i].

9. The method of claim 8, wherein the first amount is 30 percent of the confidence value and the second amount is 90 percent of the confidence value.

10. The method of claim 8, wherein each soft bit value included in the first sequence of soft bit values comprises a confidence value;

the step of determining the third sequence of soft bit values (sbv3[n]), comprises comparing: sbv1[i] with hbv[i], for each i=1, . . . , n, to determine whether the sign of sbv1[i] matches hbv[i];

increasing the confidence value of sbv1[i] by a first amount in response to determining that the sign of sbv1[i] matches hbv[i] or decreasing the confidence value of sbv1 [i] by a second amount in response to determining that the sign of sbv1[i] does not match hbv[i].

11. The method of claim 8, wherein the receiving device further includes a channel estimation unit that outputs a channel response, and the first demodulator receives the channel response and uses the received channel response and the received sequence of CSPs to determine the first sequence of soft bit values (sbv1[n]).

12. The method of claim 8, wherein the second demodulator produces an initial sequence of soft bit values before outputting the second sequence of soft bit values, and the second demodulator receives the first sequence of soft bit values and uses the received first sequence of soft bit values and the initial sequence of soft bit values to produce the second sequence of soft bit values.

13. The method of claim 8, wherein the first demodulator uses one or more of: a decision feedback sequence estimation (DFSE) type algorithm, maximum likelihood sequence estimation (MLSE) type algorithm, and a maximum a posteriori (MAP) type algorithm, in producing the first sequence of soft bit values.

14. The method of claim 8, wherein the first demodulator uses at least a first amount of processing power to produce the first sequence of soft bit values, the second demodulator uses at most a second amount of processing power to produce the second sequence of soft bit values, and the second amount of processing power is less than 80% of the first amount of processing power.

15. The method of claim 8, wherein the first demodulator uses at least a first amount of battery power to produce the first sequence of soft bit values, the second demodulator uses at most a second amount of battery power to produce the second sequence of soft bit values, and the second amount of battery power is less than 60% of the first amount of battery power.

16. The method of claim 8, wherein the second demodulator is an angle based demodulator.

17. The method of claim 8, further comprising determining a final sequence of hard bit values based on the third sequence of soft bit values.

18. A communication device, comprising:

a radio frequency (RF) unit configured to process a received signal to produce a sequence of complex sample pairs (CSP-1, CSP-2, . . . , CSP-X);

a first demodulator configured to receive the sequence of CSPs and use the received sequence of CSPs to determine a first sequence of soft bit values (sbv1[n]);

a second demodulator configured to receive the sequence of CSPs and use the received sequence of CSPs to determine a second sequence of soft bit values (sbv2[n]) or a first sequence of hard bit values (hbv[n]); and a combiner configured to determine a third sequence of soft bit values (sbv3[n]) based on (a) the first and second sequences of soft bit values or (b) the first sequence of soft bit values and a first sequences of hard bit values (hbv[n]), wherein each soft bit value included in the first sequence of soft bit values comprises a confidence value; and the combiner is configured to determine the third sequence of soft bit values (sbv3[n]) by:

comparing sbv1[i] with sbv2[i], for each i=1, . . . , n, where n is a positive integer, to determine whether the sign of sbv1[i] matches the sign of sbv2[i]; and increasing the confidence value of sbv1[i] by a first amount in response to determining that the sign of sbv1[i] matches the sign of sbv2[i] or decreasing the confidence value of sbv1[i] by a second amount in response to determining that the sign of sbv1[i] does not match the sign of sbv2[i].

19. The communication device of claim 18, wherein the first amount is 30 percent of the confidence value and the second amount is 90 percent of the confidence value.

20. The communication device of claim 18, wherein each soft bit value included in the first sequence of soft bit values comprises a confidence value; and the combiner is configured to determine the third sequence of soft bit values (sbv3[n]) by:

comparing sbv1[i] with hbv[i], for each i=1, . . . , n, to determine whether the sign of sbv1[i] matches hbv[i]; and increasing the confidence value of sbv1[i] by a first amount in response to determining that the sign of sbv1[i] matches hbv[i] or decreasing the confidence value of sbv1 [i] by a second amount in response to determining that the sign of sbv1[i] does not match hbv[i].

21. The communication device of claim 18, further comprising a channel estimation unit configured to output a channel response, wherein the first demodulator is configured to receive the channel response and use the received channel response and the received sequence of CSPs to determine the first sequence of soft bit values (sbv1[n]).

22. The communication device of claim 18, wherein the second demodulator is configured to produce an initial sequence of soft bit values before outputting the second sequence of soft bit values, and the second demodulator is further configured to receive the first sequence of soft bit values and use the received first sequence of soft bit values and the initial sequence of soft bit values to produce the second sequence of soft bit values.

23. The communication device of claim 18, wherein the first demodulator is configured to use one or more of: a decision feedback sequence estimation (DFSE) type algorithm, maximum likelihood sequence estimation (MLSE) type algorithm, and a maximum a posteriori (MAP) type algorithm, in producing the first sequence of soft bit values.

24. The communication device of claim 18, wherein
the first demodulator uses at least a first amount of processing power to produce the first sequence of soft bit values,
the second demodulator uses at most a second amount of processing power to produce the second sequence of soft bit values, and
the second amount of processing power is less than 80% of the first amount of processing power.

25. The communication device of claim 18, wherein
the first demodulator uses at least a first amount of battery power to produce the first sequence of soft bit values,
the second demodulator uses at most a second amount of battery power to produce the second sequence of soft bit values, and
the second amount of battery power is less than 60% of the first amount of battery power.

26. The communication device of claim 18, wherein the second demodulator is an angle based demodulator.

27. The communication device of claim 18, further comprising a decoder configured to determine a final sequence of hard bit values based on the third sequence of soft bit values.

28. An angle based demodulation method, comprising:
a receiving device receiving a signal transmitted by a transmitting device;
the receiving device processing the signal to produce a sequence of complex sample pairs ($CSP_1$, $CSP_2$, ..., $CSP_N$), wherein each complex sample pair ($CSP_i$) has a corresponding angle $A_i$, for i=1 ... N, where N is a positive integer;
the receiving device determining a set of two or more reference angle (RA) values; and
the receiving device determining a set of bit values based on the angles corresponding to the sequence of complex sample pairs and the set of RA values, wherein each bit value included in the set of bit values corresponds to an adjacent pair of CSPs,
wherein each complex sample pair includes an in-phase (I) component and a quadrature (Q) component, and the corresponding angle of each complex sample pair is defined as arctan (Q/I), and
wherein the step of determining the set of bit values comprises selecting a bit value to correspond to a particular pair of said CSPs ($CSP_i$, $CSP_{i+1}$).

29. A communication device, comprising:
a radio frequency (RF) unit configured to process a received signal to produce a sequence of complex sample pairs ($CSP_1$, $CSP_2$, ..., $CSP_N$), wherein each complex sample pair ($CSP_i$) has a corresponding angle $A_i$, for i=1 ... N, where N is a positive integer; and an angle based demodulator (ABD) coupled to the RF unit, the angle based demodulator being configured to: (1) determine a set of two or more reference angle (RA) values; and (2) determine a set of bit values based on the angles corresponding to the sequence of complex sample pairs and the set of RA values, wherein each bit value included in the set of bit values corresponds to an adjacent pair of CSPs,
wherein each complex sample pair includes an in-phase (I) component and a quadrature (Q) component, and the corresponding angle of each complex sample pair is defined as arctan (Q/I), and
wherein the step of determining the set of bit values comprises selecting a bit value to correspond to a particular pair of said CSPs ($CSP_i$, $CSP_{i+1}$).

\* \* \* \* \*

UNITED STATES PATENT AND TRADEMARK OFFICE
CERTIFICATE OF CORRECTION

PATENT NO. : 8,908,808 B2  
APPLICATION NO. : 13/303268  
DATED : December 9, 2014  
INVENTOR(S) : Das et al.

Page 1 of 1

It is certified that error appears in the above-identified patent and that said Letters Patent is hereby corrected as shown below:

In the Specification

In Column 3, Line 50, delete "AD," and insert -- $AD_i$ --, therefor.

In Column 4, Line 13, delete "$E_1 + E_3$" and insert -- $E_1 + E_3 + E_7$, --, therefor.

In Column 8, Line 42, delete "combiner 222" and insert -- combiner 220 --, therefor.

In Column 8, Line 64, delete "samples 210)." and insert -- samples 200). --, therefor.

In Column 9, Line 25, delete "combiner 222" and insert -- combiner 220 --, therefor.

In Column 10, Line 58, delete "as 222." and insert -- as 220. --, therefor.

In Column 12, Line 6, delete "bits of 1" and insert -- bits of I --, therefor.

Signed and Sealed this  
Twenty-first Day of July, 2015

Michelle K. Lee  
*Director of the United States Patent and Trademark Office*